United States Patent [19]
Waske et al.

[11] 3,897,880
[45] Aug. 5, 1975

[54] HAY HANDLING APPARATUS

[75] Inventors: Robert J. Waske, Grant City;
Francis D. Hughes, Denver, both of Mo.

[73] Assignee: Francis Donald Hughes, Denver, Mo.

[22] Filed: Mar. 6, 1974

[21] Appl. No.: 448,500

[52] U.S. Cl. .......................... 214/147 R; 214/77 R
[51] Int. Cl. ............................................. B60p 1/00
[58] Field of Search .......... 214/147 R, 147 G, 77 R, 214/78, 653, 1 BD, 6 B

[56] References Cited
UNITED STATES PATENTS

| | | | |
|---|---|---|---|
| 3,052,366 | 9/1962 | Duncan | 214/147 G |
| 3,057,490 | 10/1962 | Sauer | 214/147 G X |

FOREIGN PATENTS OR APPLICATIONS

| | | | |
|---|---|---|---|
| 870,038 | 6/1961 | United Kingdom | 214/77 R |

*Primary Examiner*—Frank E. Werner
*Attorney, Agent, or Firm*—Lowe, Kokjer, Kircher, Wharton & Bowman

[57] ABSTRACT

A device for moving large bales of hay weighing 1,500 pounds or more is presented by the present invention. The device is particularly adapted for use with "pick up" trucks. A first support member is adapted to be pivotally coupled with the truck at the rear of the bed. This support member is normally positioned horizontally and a second generally L-shaped support member is rigidly coupled to the first member. The long leg of the L-shaped second member is also disposed horizontally and extends a length at least equal to the length of the bale to be moved. Secured to the first support member are first and second lance components positioned for piercing a bale of hay upon movement of the vehicle in the direction of the bale. Additional lance components are pivotally coupled to the end of the second support member. These additional lance components are normally biased into a bale-clearing position by a coil spring. The additional lance components may be moved, however, against the action of the spring by operation of an electric winch to pierce the bale in opposing relationship to the first-mentioned lance components. Continued operation of the winch pivots the support members and the bale onto the bed of the vehicle for transport.

9 Claims, 4 Drawing Figures

3,897,880

PATENTED AUG 5 1975

HAY HANDLING APPARATUS

This invention relates to apparatus for use in moving bales of hay and, more particularly, to a device for moving large bales weighing several hundred pounds onto a vehicle for subsequent transport by the vehicle.

In the last few years, farmers and ranchers who feed cattle during the winter months have turned to extremely large size bales of hay as a labor saving measure. Such bales are formed by a special hay baling machine which tightly compacts the bale in a generally cylindrical configuration weighing in the vicinity of 1,500 pounds or greater and having a diameter of 4 to 5 feet.

Obviously, the size and weight of the bales precludes their movement by manual labor unless an impractical number of people are employed. Heretofore, movement of the bales has been accomplished by pushing them with a tractor or in some cases "pinching" the bales between two tractors for movement over a relatively short distance. In other cases, prongs have been secured to conventional tractor "high loaders" and the bales moved in this manner. All of the prior art devices and techniques are generally unsatisfactory for both their awkward and unsafe characteristics.

The present invention eliminates the undesirable aspects of the prior art by providing a device which can be detachably mounted on a conventional farm vehicle such as a pick up truck and quickly and efficiently, as well as safely, move a large bale of hay weighing one thousand to two thousand pounds.

It is therefore an object of the present invention to provide apparatus for moving large bales of hay which apparatus can be detachably mounted on a conventional pick up truck.

It is also an objective of this invention to provide apparatus as described in the foregoing object wherein the mounting means for the apparatus does not interfere with the normal cargo-carrying function of the truck when the apparatus is removed therefrom.

It is also an aim of the present invention to provide apparatus for transporting a large bale of hay wherein the bale is moved onto a vehicle and held in a stable position wherein there is no possibility of the bale becoming dislodged and falling from the vehicle during transport.

As a corollary to the above aim, an object of the invention is to provide apparatus which holds the bale on the vehicle at the lowest possible location thereby keeping the center of gravity of the loaded vehicle at a low elevation and minimizing any possibility of the vehicle turning over during transport of the bale.

Still another object of the present invention is to provide apparatus for moving a large bale of hay onto a vehicle and then unloading the bale from the vehicle whereby removal of the apparatus from the bale requires only minimal effort.

It is also an important aim of this invention to provide apparatus of the type described in the foregoing objects which can be fully operated in a safe manner by a single operator.

Still another objective of this invention is to provide apparatus for moving large bales of hay onto a vehicle for transport by the vehicle which apparatus can handle large bales of different sizes without requiring modification of the apparatus.

Other objects of the invention will be made clear or become apparent when the following description and claims are read in light of the accompanying drawing, wherein:

Figure 1:
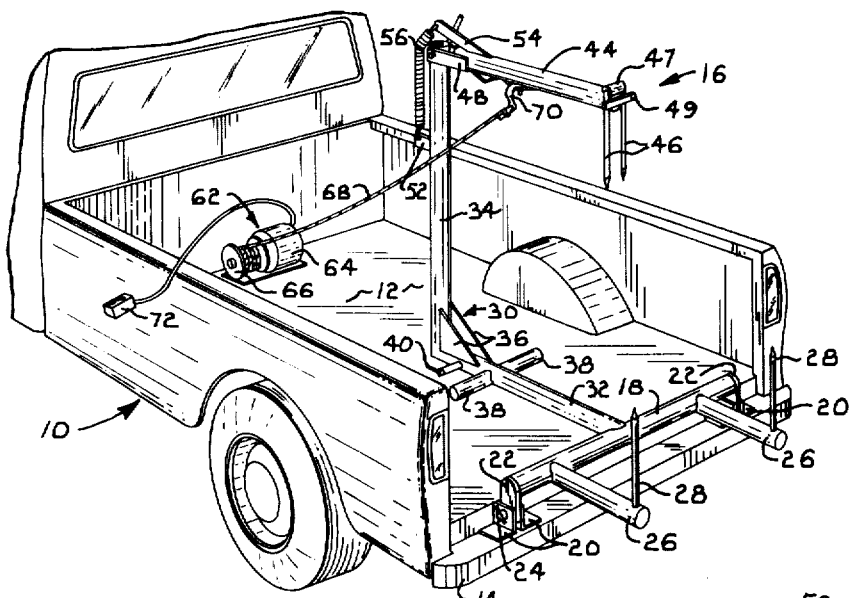
FIG. 1 is a perspective view of the rear of a pick up truck on which is mounted the apparatus of the present invention for moving a large bale of hay onto the truck.

Referring initially to FIG. 1 of the drawing, a conventional flat bed truck type vehicle of the type commonly referred to as a "pick up" truck is fragmentarily shown and designated generally by the numeral 10. Vehicle 10 includes a flat bed 12 and a heavy-duty rear bumper 14. The tailgate of vehicle 10 has been removed and such is easily accomplished with most late model trucks.

The apparatus of the present invention is pivotally mounted at the rear of vehicle 10 and is designated generally by the numeral 16. A first horizontal support member 18 is disposed at the rear of the vehicle and extends laterally across the width of bed 12. Two pairs of spaced apart angle brackets 20 are welded or otherwise rigidly secured to rear bumper 14 to provide a mount for support member 18. Apertured plates 22 are rigid with each end of member 18 and have their openings aligned with appropriate size openings in brackets 20 to receive keeper pins 24 (one of which is visible in FIG. 1) to complete the pivotal mounting of member 18.

Rigid with member 18 and extending laterally therefrom are first and second elongated brackets 26 which mount first and second lance components 28 in spaced apart relationship on the support member.

Extending from member 18 in the opposite direction from brackets 26 at a location midway along the length of the member is a second support member designated generally by the numeral 30 which is of generally L-shaped configuration. A first leg 32 of member 30 is disposed midway along the length of first member 18 and is rigid with the latter. A second leg 34 meets the first leg 32 at a right angle and is rigid with the latter, additional support being provided by a pair of gusset plates 36. Also rigid with first leg 32 are opposed horizontal stabilizers 38 for purposes to be made clear hereinafter. Finally, a bracket 40 extends from one side of leg 32 which bracket is provided with a rubber sleeve 42.

Pivotally mounted at the end of leg 34 opposite the end to which leg 32 is joined is a mounting rod 44 for third and fourth lance components 46. Lance components 46 are formed from a continuous length of rod stock and are pivotal in one direction inside of a sleeve 47 secured to the mounting rod 44. A stop 49 is welded to the end of rod 46 to limit movement of components 46 within sleeve 47. Also rigidly secured to rod 44 are apertured plates 48 (one of which is visible in FIG. 1). These plates have their holes aligned with a similar sized hole in leg 34 so as to receive a pivot pin 50. Two spaced brackets 52 and 54 rigid with legs 34 and rod 44 respectively provide means for mounting a heavy coil spring 56 which biases rod 44 in a counterclockwise direction when viewing FIGS. 1–3. A handle 58 is rigid with one of the plates 48 and projects outwardly from rod 44 for purposes to be made clear hereinafter. There is also secured to one side of rod 44 two eyelet presenting brackets 60.

A power winch designated generally by the numeral 62 is secured to vehicle 10 at the front end of bed 12. Winch 62 includes an electric motor 64, and a drum 66 around which is wound a cable 68. One end of the cable is provided with a hook 70 for positioning within one of the eyelets presented by brackets 60. An electrical control box 72 for motor 64 is provided at a convenient location to enable an operator to have access thereto from a convenient position in or at the side of the vehicle.

Figure 2:
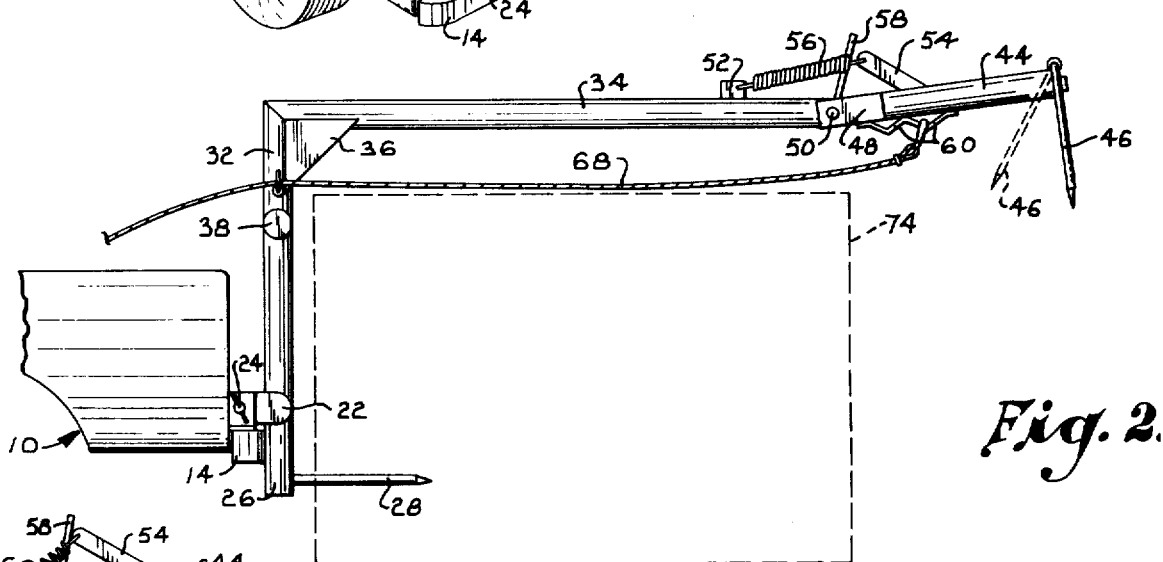
FIG. 2 is a side elevational view of the apparatus for moving a bale of hay with the position of the bale indicated by broken lines.
Figure 3:
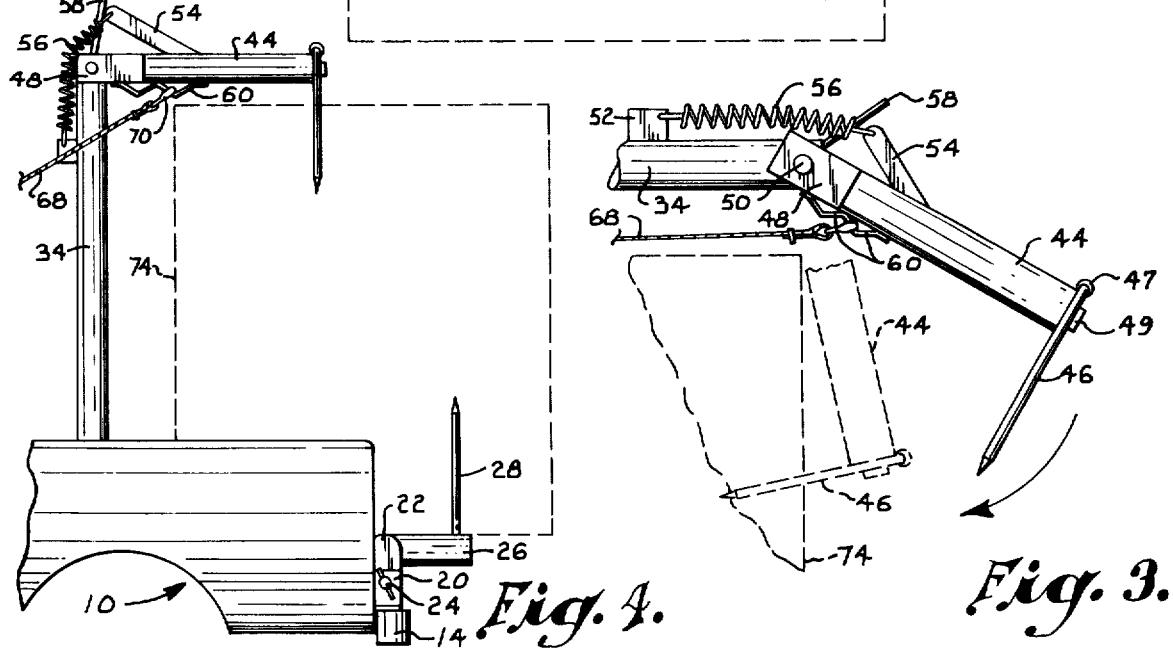
FIG. 3 is an enlarged fragmentary side elevational view of the lance means disposed at one end of the apparatus which is movable into the broken line position to pierce the bale of hay which is fragmentarily represented by broken lines.
Figure 4:
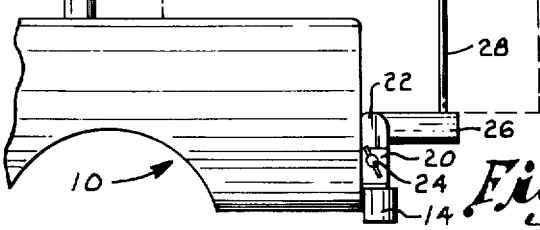
FIG. 4 is a side elevational view of the apparatus shown in FIGS. 1 and 2 as it is moved into its bale carrying position supported on the bed of the truck.

When a large bale of hay such as that shown in broken lines in FIGS. 2–4 and designated by the numeral 74 is to be moved, this is easily accomplished by apparatus 16. Support members 18 and 30 are first moved to the position shown in FIG. 2 wherein leg 32 extends generally upright and leg 34 extends horizontally at a length at least equal to the longitudinal dimension of bale 74. The apparatus is moved into this position by unwinding cable 68 on drum 66 and manually pivoting member 18. As any tension on cable 68 is released spring 56 will bias rod 44 and the lance components 46 secured thereto into the position illustrated in FIG. 2. In this position the lance components 46 will clear the top of bale 74 as vehicle 10 is moved in the direction of the bale to cause first and second lance components 28 to pierce the bale at a point somewhere beneath its center axis. The pivotal axis of components 46 allows them to yield to any obstruction such as a "high" portion of the bale. Once the lance components 28 are fully embedded in the bale, winch 62 is activated to bring taut the cable 68 and move rod 44 and lance components 46 into the broken line position in FIG. 3 against the action of biasing spring 56. Thus, lance components 46 pierce bale 74 at a point somewhat above its center axis and as the winch continues to wind up the cable the lance components will be fully embedded in the bale. Continued operation of winch 62 causes members 18 and 30 along with the bale which is firmly held between the opposed lance members to pivot through an arc of ninety degrees into the position illustrated in FIG. 4. In this position, leg 32 rests upon bed 12 and stabilizers 38 also engages the bed to help balance the load and minimize stresses on the support members.

Apparatus 16 is designed so that the vertical plane of the center of gravity of bale 74 is positioned slightly to the right of the vertical plane of pivot pins 24 when viewing FIG. 4. This assures that when it is desired to unload the bale, all that is required is to release cable 68 and the weight of the bale will cause it to pivot support members 18 and 34 back to the position illustrated in FIG. 2. Once the bale is again resting on the ground and all tension is released from cable 68, spring 56 again urges rod 44 in a counterclockwise direction. This facilitates removal of lance components 46 from the bale through the application of force in a counterclockwise direction on handle 58. The other lance components 28 are extracted as vehicle 10 moves away from the bale.

The particular positioning of the lance components 28 and 46 in spaced apart relationship to an adjacent lance component and in vertically spaced relationship to the opposing lance components is very desirable for obtaining maximum stability both in loading the bale onto the vehicle and in transporting the bale with the vehicle. By virtue of the fact that the center of gravity of the load is maintained relatively low, there is little danger of the vehicle 10 tipping when bale 74 is being moved. This is to be contrasted with efforts to move such bales through the use of high loaders where it is often necessary to raise the bale to a substantially greater height where the danger of an upset becomes significantly greater. The overall configuration of apparatus 16 and the provision of two or more eyelets along the length of rod 44 for receiving hook 70 allows different sized bales to be accommodated. While it has been found preferable to utilize an electric winch as the power source for moving the lance components 46 into a position piercing bale 74, it should be appreciated that other power means including gasoline and hydraulic powered equipment can be substituted for the electric winch.

When it is desired to move apparatus 16 from the vehicle 10 to permit the latter to be used for more conventional cargo-carrying functions, this is easily accomplished by removing the means utilized to secure winch 62 and pulling pins 24. It should also be appreciated that brackets 20 may vary somewhat in particular size and configuration depending upon the specific type and size of vehicle which is utilized with the apparatus. In this regard, it should be emphasized that while particular reference has been made to utilization of the apparatus of the invention on a pick up truck type vehicle, it is contemplated that it will also find utilization with other vehicles. For example, a conventional farm tractor outfitted with a flat bed "carry-all" attachment on its drawbar could be utilized with the apparatus of the present invention.

We claim:

1. Apparatus adapted to be releasably mounted on a utility vehicle characterized by a generally horizontal load-carrying member at the rear of the vehicle for moving a bale of hay onto said vehicle for transport by the vehicle, without interference with other uses of the vehicle when the apparatus is removed therefrom, said apparatus comprising:

a first support member adapted to be pivotally coupled with the vehicle adjacent the rearward edge of said load-carrying member and movable about an axis from a first position generally perpendicular to said load-carrying member through an arc of approximately 90° to a second position generally parallel to said load-carrying member;

first lance means coupled with said first support member and projecting laterally from the first member away from the rear of the vehicle for piercing said bale;

a second support member rigidly coupled with said first member and projecting laterally from the first member in generally the same direction as said first lance means to extend over and along the longitudinal dimension of said bale;

second lance means coupled with said second member and movable from a retracted position and a position generally parallel to and opposing said first lance means for piercing said bale, said retracted position being at least 90° removed from said bale piercing position;

biasing means for urging said second lance means into said retracted position; and power means for moving said second lance means against the action of said biasing means and into said bale piercing position after said first lance means has been driven into the bale by movement of the vehicle in the direction of the bale, said power means also being adapted to pivot said first member about its axis from said first position to said second position whereby to move said bale onto said vehicle.

2. The invention of claim 1, wherein said vehicle is of the truck type having a flat bed and said first support member is adapted to be coupled with the vehicle at the rear of the latter for pivotal movement in and out of said bed.

3. The invention of claim 2, wherein said first support member extends laterally of said bed and said first lance means comprises first and second spaced apart lance components.

4. The invention of claim 3, wherein is included first and second elongated brackets coupled with said first support members for mounting said first and second lance components in depending relationship to said first support member.

5. The invention of claim 3, wherein said second lance means is disposed in a vertical plane intermediate the vertical planes of said first and second lance components.

6. The invention of claim 3, wherein said second lance means comprises third and fourth lance components disposed in closely spaced relationship relative to the spacing between said first and second lance components.

7. The invention of claim 6, wherein the first and second lance means are disposed at different vertical elevations when in their bale-piercing positions.

8. The invention of claim 3, where said first support member is supported on the bed of the vehicle when said first member is in said horizontal position, and wherein is included opposed horizontal stabilizers coupled with said first member and extending from the latter in opposite directions for engagement with said bed when said first member is supported on the bed.

9. The invention of claim 3, wherein said power means comprises power winch means having a cable secured to said second lance means.

* * * * *

UNITED STATES PATENT OFFICE
CERTIFICATE OF CORRECTION

Patent No. 3,897,880         Dated August 5, 1975

Inventor(s) Robert J. Waske and Francis D. Hughes

It is certified that error appears in the above-identified patent and that said Letters Patent are hereby corrected as shown below:

Col. 4, line 63, the second occurrence of "and" should be deleted and "to" should be inserted.

Signed and Sealed this fourteenth Day of October 1975

[SEAL]

Attest:

RUTH C. MASON
Attesting Officer

C. MARSHALL DANN
Commissioner of Patents and Trademarks